June 8, 1965  A. H. RZEPPA  3,187,520
CONSTANT VELOCITY UNIVERSAL JOINT
Filed April 24, 1963  2 Sheets-Sheet 1

INVENTOR.
ALFRED H. RZEPPA
BY
Whittemore, Hulbert & Belknap
ATTORNEYS

June 8, 1965　　　A. H. RZEPPA　　　3,187,520
CONSTANT VELOCITY UNIVERSAL JOINT
Filed April 24, 1963　　　2 Sheets-Sheet 2
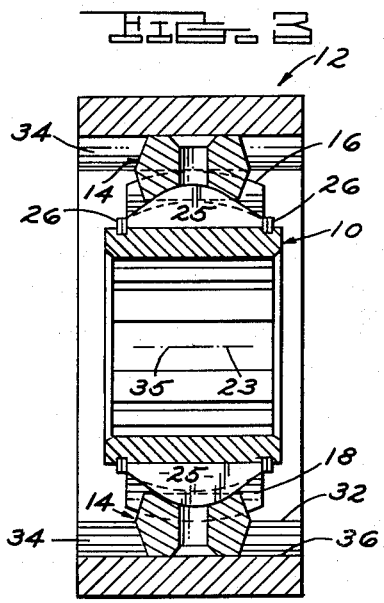
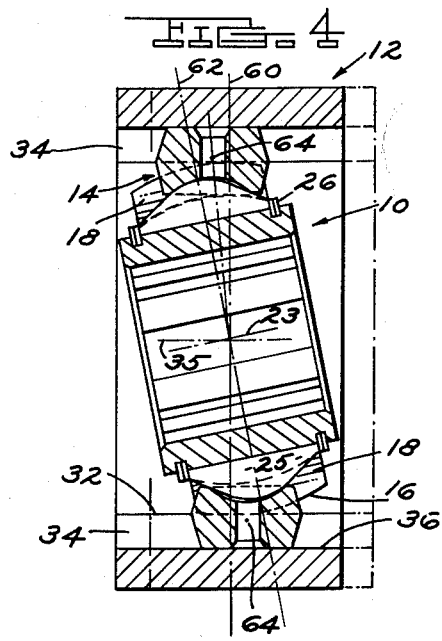
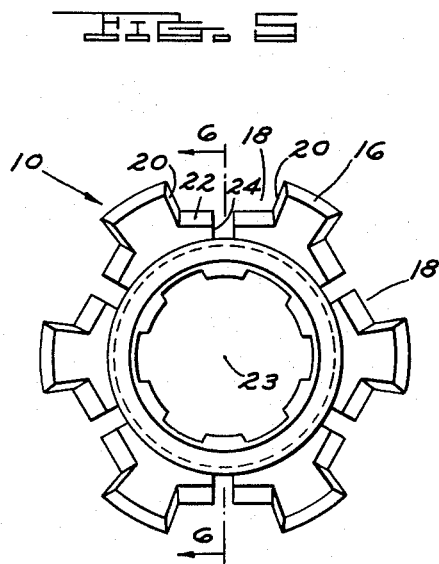
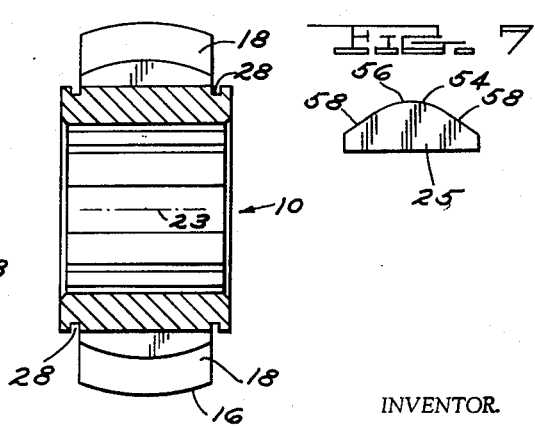
INVENTOR.
ALFRED H. RZEPPA
BY
Whittemore, Hulbert & Belknap
ATTORNEYS United States Patent Office 3,187,520
Patented June 8, 1965

3,187,520
CONSTANT VELOCITY UNIVERSAL JOINT
Alfred Hans Rzeppa, Columbus, N.C.
Filed Apr. 24, 1963, Ser. No. 275,271
10 Claims. (Cl. 64—21)

This invention relates generally to universal joints, and refers more particularly to universal joints of the so-called constant velocity type.

One object of the invention is to provide a universal joint of the type having torque transmitting rollers between the races so constructed as to permit relative axial movement as well as angular movement of the races.

Another object of the invention is to provide a universal joint having torque transmitting rollers between the races in registering generally axially extending grooves, provided with novel means for locating the rollers in predetermined axial positions in the registering grooves depending on the angular relationship between the races.

Another object is to provide means entirely on one of the races adapted to locate the rollers in predetermined axial positions in the registering grooves.

Another object is to provide a universal joint having cams in the bottoms of the inner race grooves engageable with the rollers to position the rollers in a plane which bisects the angle formed by the planes of rotation of the races.

Another object is to provide a universal joint wherein the inner surface of the outer race may be cylindrical or spherical, as desired.

Another object is to provide a universal joint wherein the inner race is spherical and the inner surface of the outer race is cylindrical so that the races can move relative to one another both angularly and axially.

Another object is to provide a universal joint in which the inner surfaces of the rollers are dished to provide a concave cam engaging surface, and the outer surfaces of the cams are formed to match the radial contour of the concave roller surfaces, the arrangement being such that the rollers are positioned by the cams and can rotate on the cams.

Other objects and features of the invention will become apparent as the description proceeds, especially when taken in conjunction with the accompanying drawings, wherein:

FIGURE 3 is a sectional view taken on the line 3—3 of FIGURE 1 showing the races in coaxial alignment.

FIGURE 4 is a sectional view similar to FIGURE 3 but showing the races in a different angular position, and showing in dot-dash lines the outer race shifted axially relative to the inner race.

FIGURE 5 is an elevational view of the inner race.

FIGURE 6 is a sectional view taken on the line 6—6 of FIGURE 5.

FIGURE 7 is an elevational view of a cam.

Figure 1:
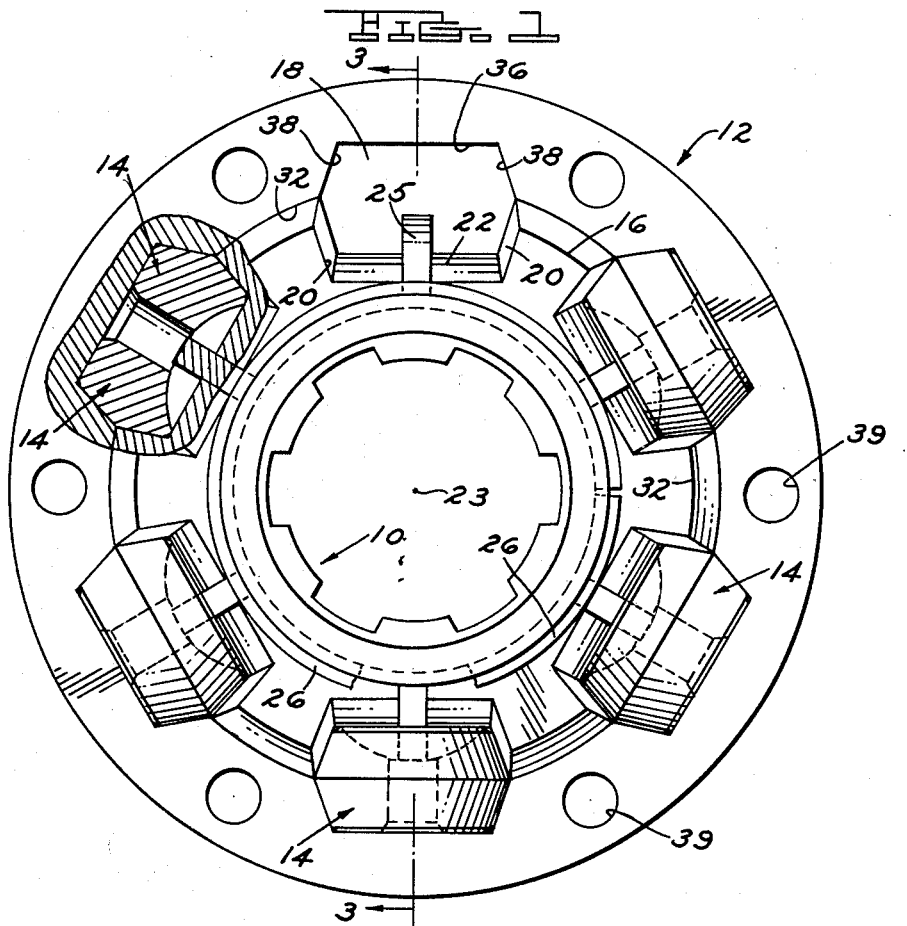
FIGURE 1 is an elevational view, with parts in section and with one roller removed for clarity of illustration, of a constant velocity universal joint embodying my invention.

Referring now more particularly to the drawings, a constant velocity universal joint is shown comprising an inner race 10, an outer race 12, and a plurality of identical torque transmitting rollers 14 between the races.

The inner race has a radially outer spherically curved surface 16 which is interrupted at circumferentially spaced points by the identical axially extending meridian grooves 18. The grooves 18 are spaced apart equal distances, and each groove has flat or slightly curved radially outwardly diverging side walls 20. The cylindrical bottom walls 22 of the grooves are so formed that their axes extend at right angles to the axis of rotation 23 of the inner race.

An elongated narrow axially extending slot 24 is formed in the bottom of each groove midway between the sides thereof, and a cam 25, more fully described hereinafter, is seated in each slot. The cams are held in the slots by spring snap rings 26 which are disposed in grooves 28 formed in the inner race. The snap rings 26 are only one of many ways of retaining the cams. The inner race may be internally splined, as shown, for connection to a driving shaft. Obviously, the inner race may be connected to a driving shaft in many different ways, and could of course be made integral with the shaft.

The outer race 12 has a cylindrical inner surface 32 formed with a plurality of circumferentially spaced extending grooves 34 which are straight and extend parallel to the axis of rotation 35 of the outer race (which axis coincides with the axis of rotation 23 of the inner race in the FIGURE 3 position). The grooves 34 have flat bottom walls 36 parallel to the axis of rotation of the outer race, and also have the radially inwardly diverging flat or slightly curved side walls 38. The grooves 34 respectively register with the grooves 18 of the inner race, as shown in FIGURE 1. The diameter of the cylindrical inner surface 32 of the outer race is equal to the diameter of the spherical outer surface 16 of the inner race, so that the surfaces 16 and 32 have line contact and can move angularly or axially with respect to one another.

The outer race may have tapped bolt holes 39 in its outer face as a means to connect the outer race to a driving flange. Obviously, other means may be provided to connect the outer race to a driving flange.

Figure 2:
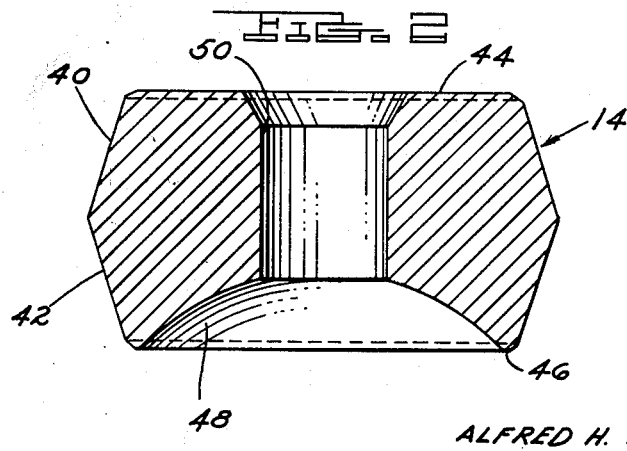
FIGURE 2 is an enlarged sectional view of a roller.

The rollers 14 are short, generally barrel-shaped members, as shown in FIGURE 2. Each roller has a radially outer frusto-conical surface 40 and a radially inner frusto-conical surface 42. These surfaces slope in opposite directions, but otherwise are substantially identical both as to angle of slope and axial length. The inner and outer ends 44 and 46 of the rollers are flat and at right angles to the roller axes. Each roller has a central, spherically concave, cam engaging surface 48 formed in the radially inner end, and is centrally bored as indicated at 50. The bore 50 has no functional significance aside from the standpoint of manufacturing and hardening.

As shown in FIGURE 1, the flare or degree of divergence of the sides 20 of the inner race grooves matches the taper of the frusto-conical surfaces 42 of the rollers, and the flare of the sides of the grooves in the outer race likewise correspond to the taper of the frusto-conical surfaces 40 of the rollers. Accordingly, the rollers have substantially a line contact with the sides of the registering grooves, it being understood that the widths of the grooves will preferably be slightly greater than the diameter of the rollers so that the rollers may turn on one side of a groove without rubbing on the other side. Actually, the surfaces 40 and 42 are not necessarily straight in sections taken axially through the rollers, but may be slightly curved. The groove surfaces 20 and 38 may be similarly curved for better contact.

The cams 25 are identical in size and shape and have the configuration shown in FIGURE 7. The cams are in the form of flat plates or ribs and fit closely within the slots 24, being confined at either end by the snap rings 26. The radially outer surfaces 54 of the cams each have a central convex portion 56 curved on a radius which approximates or is similar to the radius of the concave surfaces 48 of the rollers. This convex surface 56 blends into the straight end portions 58.

As shown in FIGURES 3 and 4, the contoured radially outer surface 54 of each cam fits within the dished or concave surface 48 of each roller in supporting or bearing engagement therewith. In FIGURE 3, the races of the joint are coaxially aligned and hence the convex portion 56 of each cam projects centrally within the concave or dished end of each roller. When the inner race is moved angularly with respect to the outer race, as shown in FIGURE 4, the cams, being fixed to the inner race, tip and axially shift the rollers in the grooves. Since the central convex portions 56 of the cams have a radius which is closely similar to the dished surfaces 48 of the rollers, there will be an extended surface-to-surface engagement of the convex cam and concave roller surfaces during the relative angular movement of the races.

While the cams 25 have been described as separate members fixed to the inner race, obviously they could, if desired, be made integral with the inner race. The cams 25 are so shaped that they will axially move the rollers within the grooves 34 of the outer race to predetermined positions such that the centers of the rollers lie in a plane which bisects the angle formed by the planes of rotation of the axes of the inner and outer races. The cams should be effective to locate the rollers in proper positions through angles up to 11.5°, and greater angles can be achieved by merely reshaping the cam profile. Preferably, the crown of the cam will have a radius approximating the concavity of the surfaces 48 in order to have an extended surface engagement therewith throughout a reasonably large angle. The cam profile is such that the rollers are maintained in contact with the outer race grooves throughout the range of axial adjustment.

Referring to FIGURE 3, the axes of rotation 23 and 35 coincide so that the centers of the rollers are disposed in the coincident planes of rotation of the races. When the races are angularly moved, as in FIGURE 4, the races rotate in different planes, and the rollers assume positions such that their centers lie in a plane which bisects the angle formed by the planes of rotation of the races. In FIGURE 4, the rotational plane of the outer race 12 is designated 60, the rotational plane of the inner race 10 is designated 62, and the center of one of the rollers is designated 64.

The sperical outer surface of the inner race has a sliding engagement with the cylindrical inner surface of the outer race so that the inner race may move both angularly and axially with respect to the outer race. If desired, the inner surface of the outer race might be spherical and have a radius the same as the outer surface of the inner race, in which case the inner race could move angularly but not axially with respect to the outer race.

What I claim as my invention is:

1. A universal joint comprising an outer race member, an inner race member fitted within said outer race member and angularly movable relative thereto, said outer race member having an inner surface provided with a plurality of generally axially extending grooves, said inner race member having an outer surface provided with a plurality of generally axially extending grooves, said outer race member grooves respectively registering with said inner race member grooves when said race members are coaxially aligned to provide pairs of registering grooves, a roller disposed within each pair of registering grooves to transmit torque from one race member to the other, and cam means fixed on one of said race members and movable as a unit therewith for engaging and positioning said rollers in a plane which bisects the rotational planes of said race members.

2. The universal joint defined in claim 1, said cam means being fixed on said inner race member.

3. The universal joint defined in claim 2, wherein said cam means comprises a separate cam for each roller, said cams having contoured portions engaging said respective rollers.

4. The universal joint defined in claim 2, wherein said cam means comprises a separate cam for each roller, said cams having contoured portions opposite said respective rollers, and said rollers having contoured surfaces engaged by the contoured portions of said respective cams.

5. The universal joint defined in claim 4, wherein said cams are secured to said inner race member in the bottoms of the grooves therein, said contoured portions of said cams project radially outwardly, and said contoured surfaces of said rollers face radially inwardly.

6. The universal joint defined in claim 5, wherein the contoured surfaces of said rollers are concave and all sections thereof taken at right angles to a radial line are circular, and said cams are in the form of flat elongated ribs extending axially of said inner race member.

7. A universal joint comprising an outer race member having a cylindrical inner surface, an inner race member fitted within said outer race member and movable axially and angularly with respect thereto, said inner race member having a spherical outer surface slidably engaging said inner surface of said outer race member, said outer surface being provided with a plurality of generally axially extending grooves, said inner surface being provided with a plurality of generally axially extending grooves, the outer race member grooves respectively registering with said inner race member grooves when said race members are coaxially aligned to provide pairs of registering grooves, a roller disposed within each pair of registering grooves to transmit torque from one race member to the other, and cam means fixed on said inner race member and movable as a unit therewith for engaging and positioning said rollers in a plane which bisects the rotational planes of said race members.

8. The universal joint defined in claim 7, wherein said cam means comprises a separate cam for each roller, said cams being secured to said inner race member in the bottoms of the grooves therein, said cams having contoured portions projecting radially outwardly, and said rollers having radially inwardly facing contoured surfaces engaged by the contoured portions of said cams.

9. The universal joint defined in claim 8, wherein said contoured surfaces of said rollers are concave and all sections thereof taken at right angles to a radial line are circular, said cams are in the form of radially disposed flat elongated ribs extending axially of said inner race member, and the contoured portions of said cams are on the radially outer surfaces of said ribs and are convex and the central portions thereof are of the same radial curvature as said contoured surfaces of said rollers.

10. The universal joint defined in claim 7, wherein said rollers are generally barrel-shaped and their axes extend generally perpendicular to the axis of said outer race member.

References Cited by the Examiner

UNITED STATES PATENTS

| | | | |
|---|---|---|---|
| 2,150,942 | 3/39 | Rzeppa | 64—21 |
| 2,313,279 | 3/43 | Suckek | 64—21 |
| 2,902,844 | 9/59 | Rzeppa | 64—21 |
| 3,076,322 | 2/63 | Wildhaber | 64—21 |
| 3,106,077 | 10/63 | Sharp | 64—21 |

FRANK SUSKO, *Primary Examiner.*

ROBERT C. RIORDON, *Examiner.*